(12) United States Patent
Jackson et al.

(10) Patent No.: US 10,422,578 B2
(45) Date of Patent: Sep. 24, 2019

(54) APPARATUS FOR CURING THIN FILMS ON A MOVING SUBSTRATE

(71) Applicant: NCC NANO, LLC, Dallas, TX (US)

(72) Inventors: Douglas K. Jackson, Austin, TX (US); Kurt A. Schroder, Coupland, TX (US); Steven C. McCool, Austin, TX (US)

(73) Assignee: NCC NANO, PLLC, Dallas, TX (US)

( * ) Notice: Subject to any disclaimer, the term of this patent is extended or adjusted under 35 U.S.C. 154(b) by 112 days.

(21) Appl. No.: 15/818,931

(22) Filed: Nov. 21, 2017

(65) Prior Publication Data

US 2019/0154334 A1 May 23, 2019

Related U.S. Application Data

(62) Division of application No. 13/081,561, filed on Apr. 7, 2011, now abandoned.

(60) Provisional application No. 61/321,910, filed on Apr. 8, 2010.

(51) Int. Cl.
| | |
|---|---|
| *F26B 3/30* | (2006.01) |
| *F26B 13/12* | (2006.01) |
| *H01B 7/42* | (2006.01) |
| *B29C 35/08* | (2006.01) |

(52) U.S. Cl.
CPC .......... *F26B 3/30* (2013.01); *B29C 35/0805* (2013.01); *F26B 13/12* (2013.01); *H01B 7/423* (2013.01)

(58) Field of Classification Search
CPC . F26B 3/30; F26B 13/12; H01B 7/423; B29C 35/085

USPC .......................................................... 34/268
See application file for complete search history.

(56) References Cited

U.S. PATENT DOCUMENTS

| | | | | |
|---|---|---|---|---|
| 3,815,054 A * | 6/1974 | McClure | .................... | H01P 3/00 174/113 R |
| 5,171,941 A * | 12/1992 | Shimizu | ..................... | H01F 6/06 174/125.1 |
| 6,049,042 A * | 4/2000 | Avellanet | .............. | B21C 37/045 174/128.1 |
| 6,313,409 B1 * | 11/2001 | Bales, Jr. | ............... | B21C 37/045 174/128.1 |
| 6,506,971 B1 * | 1/2003 | Grach | ....................... | H01B 7/30 174/32 |
| 7,114,933 B2 * | 10/2006 | Adachi | .................... | H02K 7/14 425/3 |

(Continued)

FOREIGN PATENT DOCUMENTS

| | | | | |
|---|---|---|---|---|
| CA | 2787451 C | * | 1/2018 | ......... B29C 35/0805 |
| EP | 2283934 A2 | | 2/2011 | |

(Continued)

*Primary Examiner* — Stephen M Gravini
(74) *Attorney, Agent, or Firm* — Anthony P. Ng; Russell Ng PLLC

(57) ABSTRACT

An apparatus for curing thin films is disclosed. The apparatus includes a computer control system, a conveyance system, a flashlamp controller, and a flashlamp. The curing apparatus also includes a high average power, low-inductance cable connected between the flashlamp controller and the flashlamp. The low-inductance cable is smaller in diameter and is more flexible than the prior art and includes at least one liquid cooling line and multiple forward and return path wires interleaved in a regular hexagonal closed packed configuration such that every wire is adjacent to at least one cooling line and at least one wire of opposite polarity.

2 Claims, 2 Drawing Sheets

(56) References Cited

U.S. PATENT DOCUMENTS

| | | | | |
|---|---|---|---|---|
| 7,227,097 B2* | 6/2007 | Kumar | ................... | B01D 53/92 |
| | | | | 156/345.38 |
| 8,332,005 B2* | 12/2012 | Schmidt | ................ | H01B 12/02 |
| | | | | 174/125.1 |
| 2006/0016616 A1* | 1/2006 | Goldsworthy | ......... | G02B 6/255 |
| | | | | 174/128.1 |
| 2008/0233305 A1 | 9/2008 | Murata | | |
| 2009/0181184 A1* | 7/2009 | Pope | ..................... | B41M 3/001 |
| | | | | 427/554 |
| 2011/0247851 A1* | 10/2011 | Jackson | .............. | B29C 35/0805 |
| | | | | 174/15.6 |

FOREIGN PATENT DOCUMENTS

| | | | | | |
|---|---|---|---|---|---|
| EP | 2555879 B1 | * | 2/2017 | ......... | B29C 35/0805 |
| JP | 2008229538 | | 10/2008 | | |
| JP | 6277253 B2 | * | 2/2018 | ......... | B29C 35/0805 |
| WO | 2009131490 A2 | | 10/2009 | | |
| WO | WO-2011127335 A1 | * | 10/2011 | ......... | B29C 35/0805 |

* cited by examiner

● Forward path
● Return path
○ Cooling

APPARATUS FOR CURING THIN FILMS ON A MOVING SUBSTRATE

RELATED APPLICATION

The present application is a divisional application of application Ser. No. 13/081,561 filed on Apr. 7, 2011.

PRIORITY CLAIM

The present application claims priority under 35 U.S.C. § 119(e)(1) to provisional application No. 61/321,910 filed on Apr. 8, 2010, the contents of which are incorporated herein by reference.

BACKGROUND OF THE INVENTION

1. Technical Field

The present invention relates to curing systems in general, and, in particular, to an apparatus for curing thin films on a low-temperature substrate.

2. Description of Related Art

Thermal processing of thin films is often limited by the properties of substrates. Since the cost of substrates can be a significant portion of the total cost of the final product, inexpensive substrates are generally preferred. Inexpensive substrates, such as polymer or cellulose, tend to have a lower maximum working temperature than the more expensive substrates such as glass or ceramic. Thus, when thermally processing a thin film on a low-temperature substrate, the entire substrate stack is typically heated to the maximum working temperature of the substrate to minimize processing time.

Some thin film materials require a higher level of thermal processing that is not compatible with low-temperature substrates. Solutions can come in the form of increased processing time or increased temperature. The former solution increases the cost by reducing throughput and still may be inadequate for many types of thin films. The latter solution generally requires the usage of a more expensive substrate capable of withstanding higher processing temperatures. Thus, both solutions are undesirable from an economic standpoint.

SUMMARY OF THE INVENTION

In accordance with a preferred embodiment of the present invention, a curing apparatus includes a computer control system, a conveyance system, a flashlamp driver, and a flashlamp. The curing apparatus also includes a low-inductance cable connected between the flashlamp driver and the flashlamp. The low-inductance cable includes at least one liquid cooling line and multiple forward and return path wires interleaved in a regular hexagonal closed packed configuration such that every wire is adjacent to at least one cooling line and at least one wire of opposite polarity.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
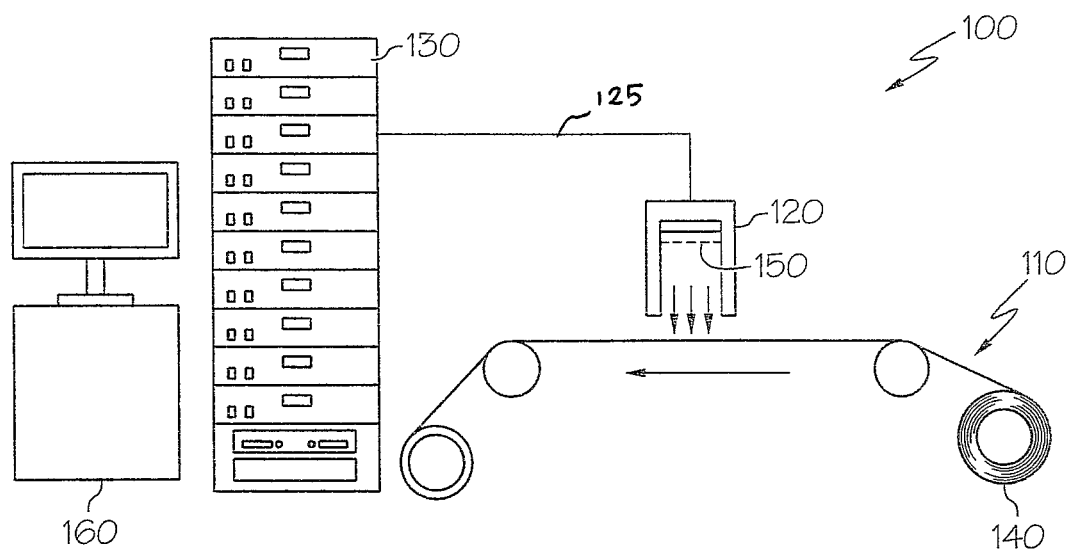
FIG. 1 is a diagram of a curing apparatus, in accordance with a preferred embodiment of the present invention.

Referring now to the drawings and in particular to FIG. 1, there is depicted a diagram of a curing apparatus, in accordance with a preferred embodiment of the present invention. As shown, a curing apparatus 100 includes a conveyance system 110, a flashlamp head 120 having a flashlamp 150 and a flashlamp controller 130. A low inductance cable 125 is connected between flashlamp controller 130 and the flashlamp head 120. Conveyance system 110 moves a thin film stack 140 past flashlamp head 120 while flashlamp controller 130 provides shaped pulses of current to flashlamp 150 using pulse width modulation (PWM) such that the shaped pulses are synchronized to the conveyance speed of thin films on conveyance system 110. Thin film stack 140 includes thin film deposited on a low-temperature substrate such as polymer or paper. Preferably, flashlamp 150 is a sealed flash lamp filled with gases such as xenon, krypton or argon. Flashlamp 150 can also be a water-wall flashlamp, sometimes referred to as a Directed Plasma Arc (DPA) lamp.

A computer control system 160 is utilized to control the functionalities of flashlamp controller 130. Computer control system 160 preferably includes a processing unit, input devices such as a keyboard, a mouse, a touchscreen, etc., and output devices such as a monitor, as they are well-known to those skilled in the art.

Figure 2:
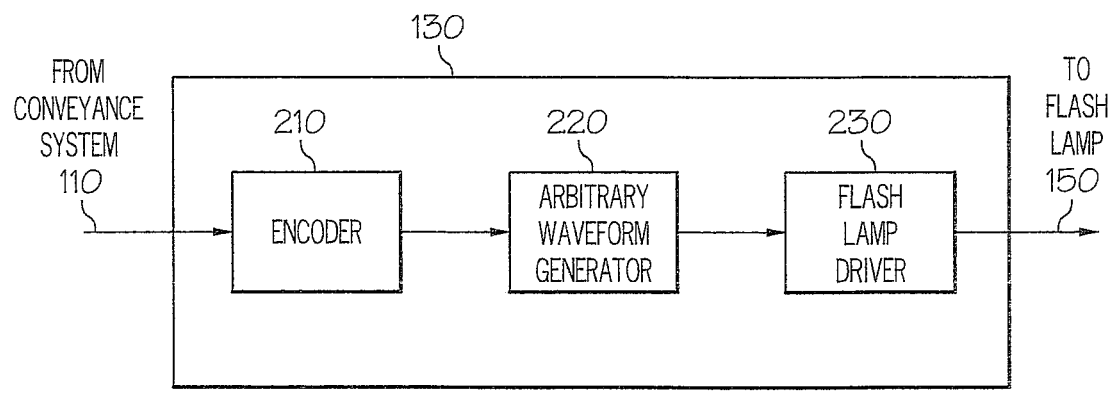
FIG. 2 is a block diagram of a flashlamp controller within the curing apparatus from FIG. 1.

With reference now to FIG. 2, there is depicted a block diagram of flashlamp controller 130. As shown, flashlamp controller 130 includes an encoder 210, an arbitrary waveform generator 220 and a flashlamp driver 230. After receiving inputs, such as conveyance speed, from conveyance system 110 (from FIG. 1), encoder 210 provides trigger signals to arbitrary waveform generator 220 at appropriate times for curing thin films located on conveyance system 110. With the trigger signals, arbitrary waveform generator 220 is able to generate waveforms of various shapes and timing based on user inputs. Arbitrary waveform generator 220 sends waveform signals to flashlamp driver 230 that amplifies the waveform signals for driving flashlamp 150 (from FIG. 1).

In order to change the shape of a pulse train emitted by a flashlamp system in response to an input in real time to affect the thermal gradient created in a moving thin film stack, the power to flashlamp 150 is preferably pulse-width modulated. In order to perform PWM, a low-inductance (at least less than 100 nH/m and preferably less than 50 nH/m) cable is needed to transmit the power from flashlamp drivers 230 to flashlamp 150. Additionally, the low-inductance cable should be water-cooled but light enough for a person to pick up and have a minimum bending radius of less than 1 foot so that that it can be integrated into a factory environment.

Theoretically, the inductance of an optimized off-the-shelf coaxial cable could be low enough for the present application but it is difficult to fabricate, since coaxial end connectors must be soldered to the inner and outer conductors in a water-tight assembly. Additionally, both the inductance and bend radius of off-the-shelf coaxial cables are larger than preferred.

Twisted pair cable has an inductance that is marginal for the present application. Additionally, the nature of the twisting in twisted pair cables makes them difficult to provide reliable cooling to the individual wires. Since the wires are twisted, they are inefficiently packed when bundled together making the outer diameter larger and therefore bend radius larger than desired. Ribbon cable, which consists of alternating forward and return path wires has an inductance that is too high for the present application.

Low-inductance cable 125, which can be referred to as a Low-Inductance Multi-Strand (LIMS) cable, includes multiple forward wires, return wires, and cooling lines, all interleaved with each other forming a hexagonal closed pack pattern. LIMS cable 125 has an extremely low inductance (~16 nH/m). LIMS cable 125 adds less than 200 nH of inductance to the entire system. LIMS cable 125 can handle up to 20 kA of current with a peak power deliver greater than 10 MW and an average power deliver of greater than 10 kW. The diameter of LIMS cable 125 is preferably less than 5.0 cm, and LIMS cable 125 can be bent about a small (less than 0.3 m) radius.

In order to pulse-width modulate a pulse train of a given total duration, each individual pulse, i.e., a micropulse, needs to be much shorter than the pulse train in order to provide pulse shaping. Furthermore, the pulses need to be more intense than a source providing a single pulse of the same length as the pulse train as the PWM system is not turned on for a portion of the time. Thus, curing apparatus 110 is capable of providing pulse lengths as short as 10 microseconds with peak power in excess of 100 kW/cm². In addition, the PWM frequency for pulses is as fast as 50 kHz.

Each pulse train includes at least two micropulses that form a shaped pulse. Shaping a pulse allows the temperature profile in thin film stack 150 to be customized for an optimal cure. In its simplest form, a shaped pulse, which includes uniform micropulses, has six variables or control parameters: intensity (voltage), pulse length, the average number of shaped pulses that impinged on the substrate in any given area on a film stack, pulse repetition frequency, number of micropulses within a shaped pulse, and duty cycle of micropulses. When the micropulses are not uniform, the duration and delay of each micropulse should also be specified. This allows the formation of an arbitrarily shaped pulse. The control parameters are initially entered into a thermal simulation, and these parameters are subsequently used as inputs to flashlamp controller 130.

When the inductance of the entire pulsed power delivery system is less than about 2 µH, the rise time of the emission from flashlamp 150 becomes limited by the rate that the plasma can be resistively heated by the current passing though flashlamp 150. Likewise, the fall rate of the emission from flashlamp 150 becomes limited by the radiation cooling rate of the plasma in flashlamp 150. When the inductance of the entire pulsed power delivery system is greater than about 2 µH, the inductance begins to increase the minimum rise and fall rate of the emission, thus limiting the frequency at which the emission can be pulsed-width modulated. The pulsed power delivery system in the present invention has a total inductance of about 1.2 µH, of which about 0.2 mH is from LIMS cable 125, meaning that the maximum PWM is not limited by inductance. LIMS cable 125 for curing apparatus 100 preferably has the following requirements:
1. low inductance per unit length (less than 50 nH/m);
2. low resistance per unit length (less than 1.0 mΩ/m);
3. long length (up to 10 meters);
4. moderate voltage rating (up to about 1,200 V)
5. active liquid cooling;
6. high current capacity (up to about 20 kA); and
7. small bend radius (less than 0.3 m) for handling.

Figures 3A, 3B, 3C, 3D:
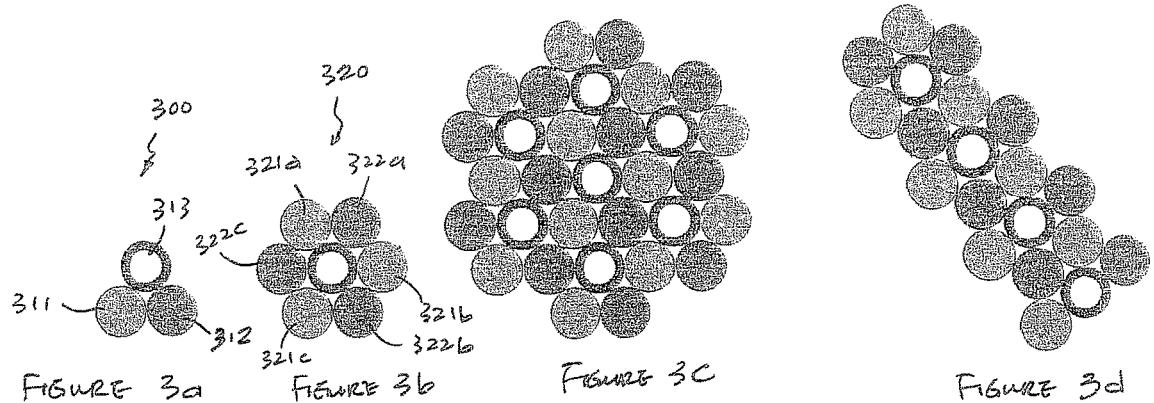
FIG. 3a is a cross-sectional diagram of a basic cable unit of a low-inductance cable within the curing apparatus from FIG. 1, in accordance with a preferred embodiment of the present invention.
FIG. 3b-3d are cross-sectional diagrams of low-inductance cables formed by the basic cable unit from FIG. 3a, in accordance with a preferred embodiment of the present invention.

Referring now to FIG. 3a, there is illustrated a cross-sectional diagram of a basic cable unit for forming LIMS cable 125, in accordance with a preferred embodiment of the present invention. As shown, a basic cable unit 300 includes a cooling channel 313, a forward-path cable 311 and a return-path cable 312. Preferably, forward-path cable 311 and return-path cable 312 are made of copper.

FIG. 3b shows that a three-pair round cable can be formed by combining several basic cable units 300. As shown, a three-pair round cable 320 includes forward-path cables 321a-321c and return-path cables 322a-322c formed around a cooling channel 323. In addition, forward path cables 321a-321c are interleave with and coupled to return path cables 322a-322c.

In order to change the shape of a pulse train emitted by flashlamp 150 in response to an input in real time to affect the thermal gradient created in a moving thin film stack cure materials on moving substrates at speeds up to 300 meters per minute, a low-inductance, water-cooled cable assembly, such as a twelve-pair round LIMS cable 330 shown in FIG. 3c and/or an eight-pair flat LIMS cable 340 shown in FIG. 3d, is essential to provide precise temporal control.

When the substrate is moving, and the shaped-pulse frequency of flashlamp 150 is synchronized to the conveyance speed, the frequency is given by $$F = \frac{1.67 \times S \times O}{W}$$

where
f=flashlamp shaped-pulse rate [Hz]
S=web speed [m/min]
O=overlap factor (i.e., the average number of flashlamp pulses received by substrate at any given point)
W=curing head width in the conveyance direction [cm]
For example, with a conveyance speed of 100 m/min, and overlap factor of 4, and a curing head width of 7 cm, the shaped-pulse rate of the strobe is 95.4 Hz.

Since the flash rate of flashlamp 150 is synchronized to the substrate conveyance speed, small changes in the speed do not appreciably change the cure of thin films.

The 8 variables of the power delivery system to flashlamp 150 can be changed continuously and on the fly. This allows the curing parameters to adapt in real time to a change in the film or substrate in response from sensor data before or after cure. These two qualities produce a cured film with optimized and consistent results and has dramatically higher yield than the prior art which requires the system to be powered down for minutes to change any pulse characteristics. Furthermore, the pulse characteristics can be changed continuously to within about 0.1% resolution, which results in a much tighter optimization control of the curing. The prior art had discrete changes.

As has been described, the present invention provides a curing apparatus for curing thin films on a moving substrate.

While the invention has been particularly shown and described with reference to a preferred embodiment, it will be understood by those skilled in the art that various changes in form and detail may be made therein without departing from the spirit and scope of the invention.

What is claimed is:

1. An apparatus for curing a thin film on a moving substrate, said apparatus comprising:
    a conveyance system for moving a layer of thin film mounted on a substrate; a flashlamp for providing electromagnetic pulses to said thin film while said thin film is being moved in relation to said flashlamp;
    a flashlamp controller for modulating pulse widths of said electromagnetic pulses; and
    a low-inductance cable connected between said flashlamp and said flashlamp controller, wherein said low-inductance cable includes
        a cooling core which provides active cooling;
        a plurality of return-path cables coupled to said cooling core; and
        a plurality of forward-path cables coupled to said cooling core, wherein said forward-path cables are interleavely coupled to said return-path cables, wherein said cooling core, said return-path cables and said forward-path cables are interleaved in a hexagonal closed packed configuration, wherein one of said return-path cables is adjacent to a cooling core and one of said forward-path cables, wherein one of said forward-path cables is adjacent to a cooling core and one of said return-path cables, wherein the plurality of return-path cables and the plurality of forward-path cables are interleaved while being coupled to the cooling core thereby forming a hexagonal closed packed configuration, and wherein the low-inductance cable includes a plurality of hexagonal closed pack configurations, wherein adjacent hexagonal closed pack configurations share one of said forward-path cables and one of said return-path cables.

2. A low-inductance cable comprising:
    a cooling core which provides active cooling;
    a plurality of return-path cables coupled to said cooling core; and
    a plurality of forward-path cables coupled to said cooling core, wherein said forward-path cables are interleavely coupled to said return-path cables, wherein said cooling core, said return-path cables and said forward-path cables are interleaved in a hexagonal closed packed configuration, wherein one of said return-path cables is adjacent to said cooling core and one of said forward-path cables, wherein one of said forward-path cables is adjacent to said cooling core and one of said return-path cables, wherein the plurality of return-path cables and the plurality of forward-path cables are interleaved while being coupled to the cooling core thereby forming a hexagonal closed packed configuration, and wherein the low-inductance cable includes a plurality of hexagonal closed pack configurations, wherein adjacent hexagonal closed pack configurations share one of said forward-path cables and one of said return-path cables.

* * * * *